United States Patent [19]
Aramendia

[11] Patent Number: 5,472,382
[45] Date of Patent: Dec. 5, 1995

[54] STEPLESS TRANSMISSION SYSTEM

[76] Inventor: Arsenio Aramendia, 9390 W. Flagler Apt. 208, Miami, Fla. 33174

[21] Appl. No.: 270,378

[22] Filed: Jul. 5, 1994

[51] Int. Cl.$^6$ .................................................... F16H 3/74
[52] U.S. Cl. ................................................ 475/107; 475/92
[58] Field of Search .............................. 475/92, 104, 107

[56] References Cited

U.S. PATENT DOCUMENTS

| | | | |
|---|---|---|---|
| 2,212,046 | 8/1940 | Ross | 475/107 |
| 2,842,011 | 7/1958 | Skowron | 475/107 |
| 2,891,423 | 6/1959 | Connell et al. | 475/107 |
| 3,893,352 | 7/1975 | Cotton | 475/107 |
| 4,729,261 | 3/1988 | Tervola | 475/107 |

*Primary Examiner*—Dirk Wright
*Attorney, Agent, or Firm*—Malloy & Malloy

[57] ABSTRACT

A stepless transmission system with a powering input shaft drivingly connected to a first sun gear, the first sun gear surrounded by a first planet gear carrier containing a number of planet gears disposed in a peripheral segment thereof so as to drivingly engage the first sun gear, and a first ring gear disposed about the first planet gear carrier so as to engage the first set of planet gears along an interior drive surface of the first ring gear such that regulated movement of the first ring gear controls movement of the first planet gear carrier that results from rotation of the input shaft and accordingly first sun gear. Additionally, the system includes a second sun gear surrounded by a second planet gear carrier, with a second set of planet gears rotatably disposed therein, the second set of planet gears being surrounded by a second ring gear that is actually connected with the first planet gear carrier such that rotation of the first planet gear carrier correspond rotation of the second ring gear. Finally, the system includes a third sun gear disposed on the input shaft, the third sun gear surrounded by a third planet gear carrier containing a third set of planet gears rotatably disposed within a peripheral segment thereof, the third set of planet gears drivingly engaging the third sun gear and drivingly engaging an interior drive surface of a third ring gear disposed thereabout such that rotation of the third ring gear is regulated through its connection with the second planet gear carrier, and finally stepped rotation of the third planet carrier connected to an output shaft results.

12 Claims, 3 Drawing Sheets

STEPLESS TRANSMISSION SYSTEM

BACKGROUND OF THE INVENTION

1. Field of the Invention

The present invention relates to a Stepless Transmission System which utilizes multiple gears to provide the necessary input to output ratios and smooth transitional changes in ratios therebetween without requiring drive belts or a clutch system, thereby providing an efficient and effective vehicle transmission.

2. Description of the Related Art

Stepless Transmission Systems have been viewed as substantial improvements over conventional transmission systems as utilized in vehicles such as cars and trucks. Specifically, stepless transmission systems prevent the significant energy losses associated with shifting gears so as to provide substantial increased fuel economy through the elimination of the power losses at shifting.

In the past, others have attempted to use drive belt systems to replace conventional gear transmission systems and formulate stepless transmissions. These belt-type transmission systems, however, can often be the subject of significant wear and tear and often require frequent replacement of the belts, a procedure which can often be complex and expensive. In particular, known belt systems commonly suspend the drive belt between a pair of two panel gears. The two panel gears are adapted to separate and come together so as to require less or more of the drive belt to be wrapped around the gear and accordingly provide varying input to output ratios resulting from the belt rotation. These space varying elements will also generally require additional space in the vehicle for positioning of the transmission, and accordingly could not be easily adapted for original or replacement installation within many existing vehicles.

Accordingly, there still is a need for a stepless transmission system which will effectively provide the necessary input to output ratios, which will be durable for extensive use in vehicles such as trucks or automobiles, which can be easily adapted for original or replacement installation in most vehicles, and which will provide the stepless functioning necessary to maximize fuel efficiency and effectiveness of the transmission. The gear transmission system of the present invention is designed specifically to function effectively as a vehicle transmission and provide the effective stepless functioning without the drawback of previously developed transmission systems.

SUMMARY OF THE INVENTION

Present invention is directed to a stepless transmission system for use in vehicles such as cars or trucks. The transmission system includes a power input shaft which rotates as a result of an exterior power source such as the vehicle engine. Disposed on that input shaft, in driving engagement therewith, is a first sun gear. The first sun gear is drivingly disposed on the input shaft such that rotation of the input shaft results in corresponding rotation of the first sun gear. Also included is a first planet gear carrier having an outer perimeter and an inner perimeter which define a peripheral segment. The first planet gear includes an axial opening defined by the inner perimeter wherein the first sun gear is rotatably disposed. Rotatably and axially mounted within the peripheral segment of the first planet gear carrier is a first set of planet gears. This first set of planet gears protrude through the outer perimeter and the inner perimeter of the first planet gear carrier, and drivingly engage the first sun gear positioned within the axial opening of the first planet gear carrier. Finally, positioned about the outer perimeter of the first planet gear carrier, in engaged relation with the first set of planet gears, is a first ring gear.

Also disposed about the input shaft, a spaced distance from the first sun gear, is a second sun gear. Similarly, the second sun gear is surrounded by a second planet gear carrier having an outer perimeter and inner perimeter which defines a peripheral segment. Disposed about a periphery of the second planet gear carrier are a second set of planet gears. The second set of planet gears are rotatably and axially mounted within the peripheral segment and protrude through the inner perimeter of the second planet gear carrier so as to drivingly engage the second planet gear. Disposed around the outer perimeter of the second planet gear carrier is a second ring gear. The second ring gear includes an interior drive surface positioned to engage the second set of planet gears which protrude through the outer perimeter of the second planet gear carrier. Additionally, the second ring gear is connected with the first planet gear carrier such that rotation of the second ring gear will correspond the axial rotation of the first planet gear carrier.

Finally, a third sun gear is disposed about the input shaft. The third sun gear is surrounded by a third planet gear carrier having an outer perimeter and an inner perimeter defining a peripheral segment, and an axial opening therein wherein the third sun gear is rotatably disposed. Rotatably and axially mounted within the peripheral segment of the third planet gear carrier are a third set of planet gears which protrude through the inner perimeter of the peripheral segment and drivingly engage the third sun gear. Surrounding the third planet gear carrier, in driving engagement with the third set of planet gears that protrude through the outer perimeter of the peripheral segment of the third planet gear carrier is a third ring gear. This third ring gear is connected to the second planet gear carrier in such a fashion that rotation of the third ring gear directly corresponds rotation of the second planet gear carrier.

Connected to the third planet gear carrier is an output shaft which will rotate at a desired rotation ratio relative to the input shaft. This rotation ratio is controlled through rotation regulator means connected with the first ring gear. The rotation regulator means restrict and regulate rotation of the first ring gear. The rotation regulator means are surrounded by a rotor which will selectively limit rotation thereof and will accordingly result in selectively limitation of the rotation of the first ring gear. Through this selective limitation of the rotation of the first ring gear a regulated output rotation of the output shaft is achieved, the greater the rotation is limited the smaller the output rotation of the output shaft relative to the input rotation of the input shaft.

It is the object of the present invention to provide a stepless transmission system which does not necessitate the use of drive belts and which will be substantially durable for extended use within a vehicle.

Still another object of the present invention is to provide a stepless transmission system which provides the benefits of stepless variation of input to output rotation without suffering from the power losses generally associated with gear changes in conventional transmissions.

Yet another object of the present invention is to provide a stepless transmission system which can provide an overdrive configuration for the vehicle in which it is used.

A further object of the present invention is to provide a stepless transmission system which is substantially durable and can be easily adapted for mounting and fitting within vehicles to replace conventional transmission system.

BRIEF DESCRIPTION OF THE DRAWINGS

For a fuller understanding of the nature of the present invention reference should be had to the following detailed description taken in connection with the accompanying drawings in which.

Like reference numerals refer to like part throughout several views of the drawings.

DETAILED DESCRIPTION OF THE PREFERRED EMBODIMENT

Figure 1:
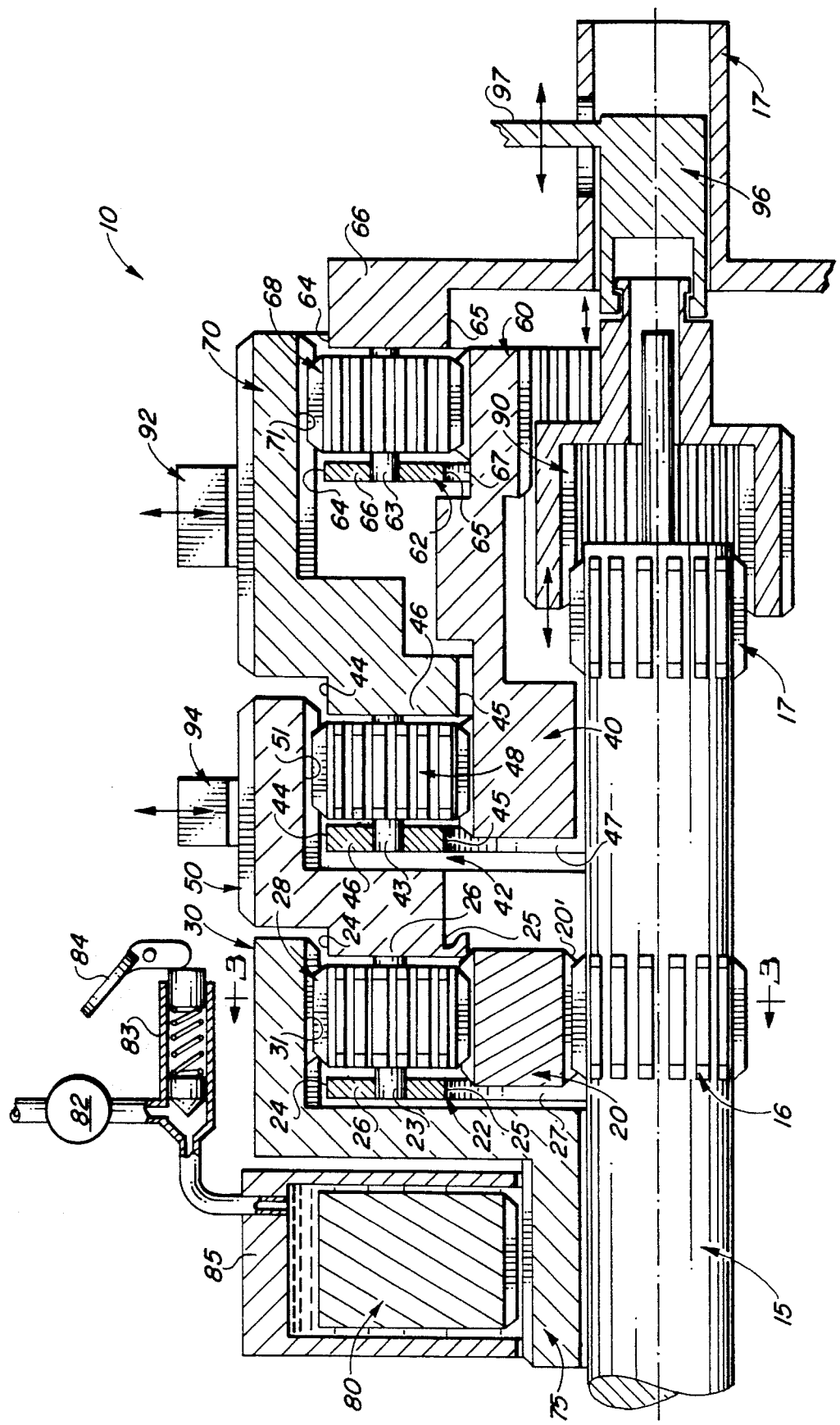
FIG. 1 is a quarter cross-sectional view of the system of the present invention.

Shown throughout the figures, the present invention is directed towards a stepless transmission system, generally indicated as 10. The stepless transmission system 10 is adapted to receive powering input from a conventional automobile engine to an input shaft 15 and provide appropriate stepped output rotation at an output shaft 17 for use in conveying the vehicle. Specifically, the input shaft 15 will be connected to the vehicle engine such that it will rotate at specified r.p.m.s as provided by the vehicle engine and regulated through the accelerator.

Disposed on the input shaft 15 is a first sun gear 20. The first sun gear 20 is preferably a conventional toothed gear having a plurality of gear teeth disposed about a periphery thereof. In the first embodiment of the stepless transmission system 10, this first sun gear 20 is drivingly disposed on the input shaft 15. Accordingly, the first sun gear 20 will preferably include an axial opening 20' therein having a plurality of gear teeth, or other suitable engaging means disposed along a surface of the axial opening 20', and positioned to engage similarly situated teeth or engaging means 16 disposed on the input shaft 15. In such a manner, rotation of the input shaft 15 will result in corresponding, equivalent rotation of the first sun gear 20.

Also axially positioned on the input shaft 15, and disposed about the first sun gear 20, in axial alignment therewith, is a first planet gear carrier 22. This first planet gear carrier 22 includes an outer perimeter 24 and an inner perimeter 25 which define a peripheral segment 26 therebetween. Further, the inner perimeter 25 defines an axial opening 27 within the first planet gear carrier 22 wherein the first sun gear 20 is rotatably disposed. Accordingly, the first planet gear carrier 22 has a doughnut-type configuration, formed by a pair of opposing sides connected to one another by a plurality of axial connecter members 23, which surrounds the first sun gear 20.

Rotatably and axially mounted in the peripheral segment 26 of the first planet gear carrier 22, and on the axial connector members 23, are a first set of planet gears 28. In the preferred embodiment, the first set of planet gears 28 includes at least two, but preferably four small gears which are rotatably suspended in the peripheral segment 26 of the first planet gear carrier 22 with the axis of rotation of the planet gears 28 being parallel to the axis of rotation of the input shaft 15. Further, each gear of the first set of planet gears 28 has a diameter slightly larger than a diameter of the peripheral segment 26, of the first planet gear carrier 22, and is positioned therein such that it protrudes slightly through the outer perimeter 24 and through the inner perimeter 25 of the first planet gear carrier 22. The first set of planet gears 28 are positioned to independently rotate within the planet gear carrier 22 and are positioned such that they will be drivingly engaged with the first sun gear 20 positioned within the axial opening 27 of the first planet gear carrier 22. Accordingly, the rotation of the input shaft 15 will produce axial rotation of the first sun gear 20, and that results in opposing rotation of the first set of planet gears 28 within the first planet gear carrier 22.

Finally, positioned about the first planet gear carrier 22, in axial alignment therewith, is a first ring gear 30. This first ring gear 30 includes an interior, preferably toothed, drive surface 31 which is structured and disposed to engage gear teeth on the planet gears of the first set of planet gears 28 which protrude through the outer perimeter 24 of the first planet gear carrier 22. Accordingly, in order for the first set of planet gears 28 to freely rotate within the first planet gear carrier 22, upon rotation of the first sun gear 20, the first ring gear 30 must not hinder their rotation and must be allowed to freely rotate as a result of the rotation of the first set of planet gears 28. However, if rotation of the first ring gear 30 is limited by an external source, a portion of the force of rotation translated from the first sun gear 20 to the first set of planet gears 28 will not be directed to the first ring gear 30, but rather will be translated into axial rotation of the first planet gear carrier 22 as the result of the movement of the first set of planet gears 28 along the interior drive surface 31 of the first ring gear 30. Restriction of rotation of the first ring gear 30, to be described subsequently, can range from no restriction to substantial restriction, no restriction resulting in substantial translation of the rotational force from the first sun gear 20 through the freely rotating first set of planet gears 28 to the first ring gear 30 such that the first planet gear carrier 22 does not rotate, and substantial restriction of rotation of the first ring gear 30 resulting in substantial translation of the rotating force from the first sun gear 20 to circumferential movement of the first set of planet gears 28 along the interior drive surface 31 of the first ring gear 30 thereby rotating the first planet gear carrier 22 in the same direction as the rotation of the input shaft and the first sun gear 20.

Disposed the spaced distance from the first sun gear 20 is a second sun gear 40, also axially positioned about the input shaft 15. This second sun gear 40 also includes gear teeth about an exterior perimeter thereof, but is structured and disposed such that it can be selectively drivingly engaged with the input shaft 15. In particular, only when drivingly engaged with the input shaft 15 will the second sun gear 40 rotate as a direct result of the rotation of the input shaft 15. The manner of engagement and disengagement of the second sun gear 40 with the input shaft is to be described subsequently.

Disposed about the second sun gear 40, in axial alignment therewith, is a second planet gear carrier 42. The second planet gear carrier 42 is substantially similar to the first planet gear carrier 22 including an outer perimeter 44 and an inner perimeter 45, which define a peripheral segment 46, and including an axial opening 47, defined by the inner perimeter 45, wherein the second sun gear 40 is rotatably disposed.

Positioned about a perimeter of the second planet gear carrier 42, within the peripheral segment 46 is a second set of planet gears 48. This second set of planet gears 46 also includes a number of small gears rotatably and axially mounted on axial connector members 43 within the peripheral segment 46 of the second planet gear carrier 42. The gears of the second set of planet gears 48 have a rotational axis parallel to that of the input shaft 15, and are oriented so as to protrude through the outer perimeter 44 and the inner perimeter 45 of the second planet gear carrier 42. Accordingly, the second set of planet gears 48 will engage the second sun gear 40 within the axial opening 47 of the second planet gear carrier 42.

Further, protruding portions of the second set of planet gears 48 are drivingly engaged with a second ring gear 50 disposed in axial alignment about the second planet gear carrier 42. The second ring gear 50 also includes an interior drive surface 51 which is structured and disposed to engage gear teeth on the gears of the second set of planet gears 48 which protrude through the outer perimeter 44 of the second planet gear carrier 42.

Connected to the second ring gear 50 is the first planet gear carrier 22. Specifically, the first planet gear carrier 22 and second ring gear 50 are rigidly secured to one another such that rotation, or restriction of rotation, of the first planet gear carrier 22 will result in corresponding axial rotation of the second ring gear 50. In such a manner, when the first planet gear carrier 22 rotates predetermined amounts, based upon the degree of restriction of the rotation of the first ring gear 30, the second ring gear 50 will be caused to rotate resulting in corresponding rotation of the second set of planet gears 48 along the interior drive surface 51 of the second ring gear 50 and stepped down rotation of the second planet gear carrier 42.

Positioned a spaced distance from the second sun gear 40 is a third sun gear 60 axially disposed about the input shaft 15. Similarly to the second sun gear 40, the third sun gear 60 is selectively drivingly positioned about the input shaft 15 such that only when drivingly engaged with the input shaft 15 will the third sun gear 60 rotate as a direct result of the rotation of the input shaft 15.

Disposed about the third sun gear 60, in axial alignment therewith is a third planet gear carrier 62. The third planet gear carrier 62 also includes an outer perimeter 64 and an inner perimeter 65 which define a peripheral segment 66, and has an axial opening 67 defined by the inner perimeter 65 wherein the third sun gear 60 is rotatably disposed. Rotatably and axially mounted on axial connector members 63 of the peripheral segment 66 of the third planet gear carrier 62 are a third set of planet gears 68. Each gear of the third set of planet gears 68 protrudes through the inner perimeter 65 of the third planet gear carrier 62 so as to drivingly engage the third sun gear 60 within the axial opening 67 of the third planet gear carrier 62.

Positioned around the third planet gear carrier 62, in axial alignment therewith, is a third ring gear 70 having an interior drive surface 71. The interior drive surface 71 of the third ring gear 70 is structured and disposed to engage the gears of the third set of planet gears 68 which protrude through the outer perimeter 64 of the third planet gear carrier 62. Much like the second ring gear 50, the third ring gear 70 is rigidly connected to the second planet gear carrier 42 such that rotation of the second planet gear carrier 42 will result in corresponding axial rotation of the third ring gear 70 around the third planet gear carrier 62, and therefore stepped rotation of the third planet gear carrier 62.

Finally, connected to the third planet gear carrier 62 is the output shaft 17. The output shaft 17 will rotate corresponding the rotation of the third planet gear carrier 62 which provides regulated rotation as a result of the regulated movement of the third ring gear 70 about the third planet gear carrier 62 and its effect on the rotation of the third set of planet gears 68. Accordingly, as rotation of the first ring gear 30 is restricted, stepped down rotation of the first planet gear carrier 22 and the connected second ring gear 50 results, that in turn causes stepped down rotation of the second planet gear carrier 42 in accordance with the regulated rotation of the second ring gear 50, which finally results in regulated rotation of the third ring gear 70 to cause the stepped output rotation of the third ring gear carrier 62 and output shaft 17. In this manner, the input to output rotation ratios of the input shaft 15 relative to the output shaft 17 are controlled merely by varying the rotation regulation of the first ring gear 30 between varied input/output ratios.

In a second embodiment of the stepless transmission system 10' the first ring gear 30 includes a drive segment 32 which is drivingly engaged with the engaging means 16 of the input shaft 15 such that the first ring gear 30 will rotate in accordance with rotation of the input shaft 15. In such a case, it is the first sun gear 20 that includes rotation regulator means disposed about the input shaft 15 such that stepped input/output rotation is achieved by regulation of the rotation of the first sun gear 20 through the rotation regulator means. Such a configuration is particularly adapted to provide overdrive which is preferable in varying types of vehicles. The remaining gear configurations within the stepless transmission system 10' remain the same and in order to provide the stepped output it is the first ring gear 20 and not the first sun gear 30 that provides the direct rotation from the input shaft 15.

Both embodiments of the stepless transmission system 10 include rotation regulator means. The rotation regulator means of each embodiment includes a rotation regulator segment 75, positioned about the input shaft 15, which preferably extends to an exposed location about the input shaft 15. Positioned about this rotation regulator segment 75 is a rotor 80 which will provide the selective limitation of rotation at the rotation regulator segment 75, and accordingly will selectively limit rotation of the first sun gear 20 in the first embodiment, and the first ring gear 30 in the second embodiment. Connected with the rotor 80 is a hydraulic pump 82, and preferably a hydraulic oil pump, which will selectively regulate hydraulic pressure within a housing 85 of the rotor 80 and limit the resisting pressure exerted by the rotor 80 on the rotation regulator segment 75. However, any equivalent method of adjusting the regulating pressure exerted on the rotation regulator segment 75 could be effectively utilized. In the case of the hydraulic pump 82, a regulator valve 83 and control lever 84 of the hydraulic pump 82 could be manipulated through standard or automatic transmission control means so as to provide the varying hydraulic pressure and adjust the ultimate input to output rotation ratio through the regulation of the hydraulic pressure which causes the rotor 80 to regulate rotation of the rotation regulator segment 75. Utilizing the hydraulic pump 82, as higher pressure to the rotor 80 is achieved, higher input/output ratios are achieved. Generally, the recited embodiments can provide ratios from 3 to 1 up to 1.3 to 1.

Figure 2:
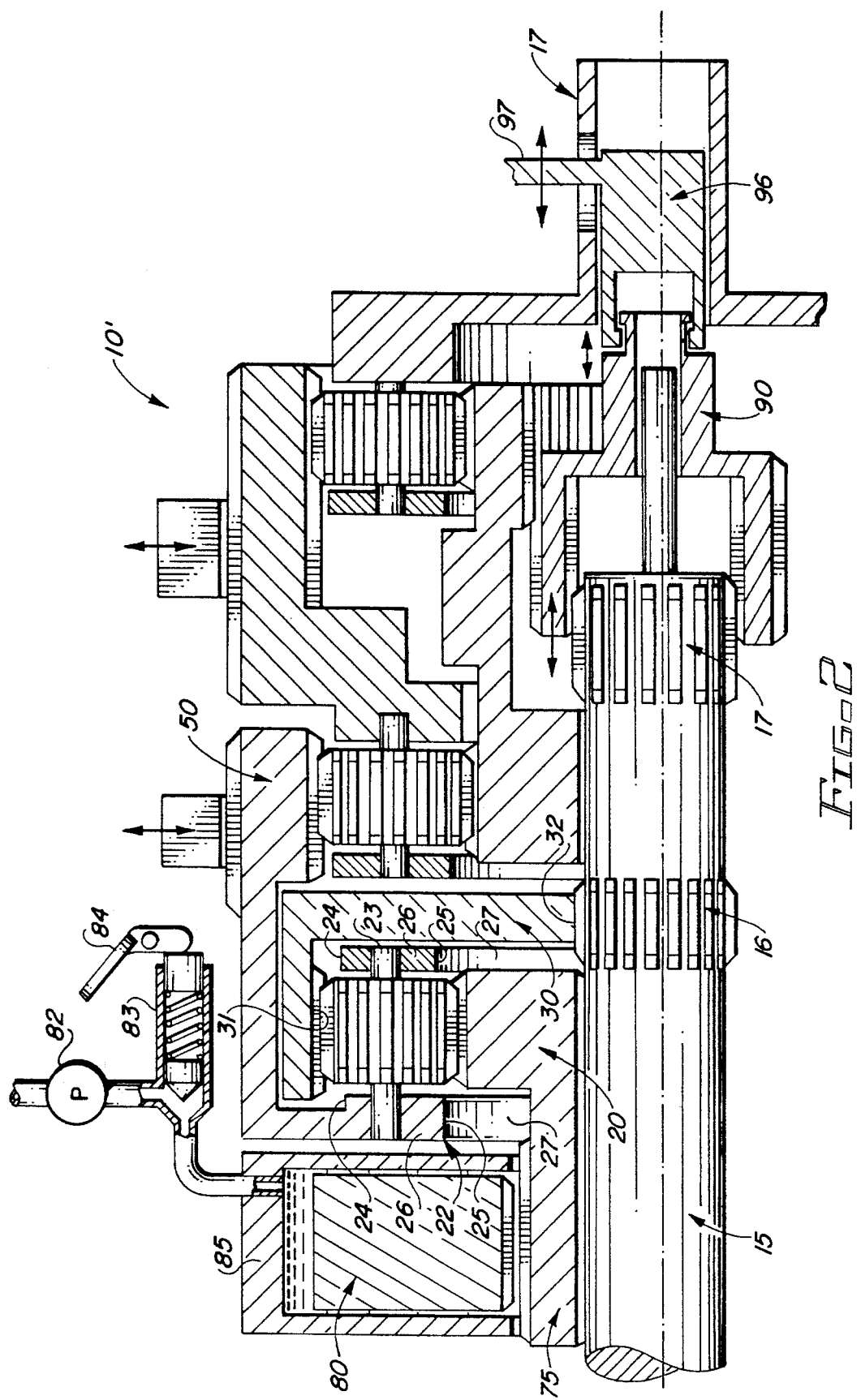
FIG. 2 is a quarter cross-sectional view of a second embodiment of the system of the present invention.
Figure 3:
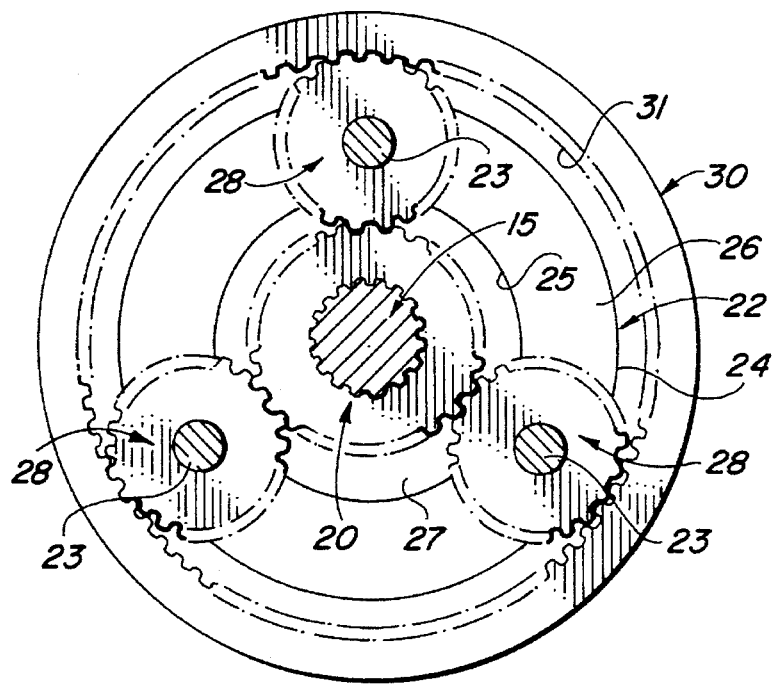
FIG. 3 is a front, cross-sectional view along line 3—3 of FIG. 1.
Figure 4:
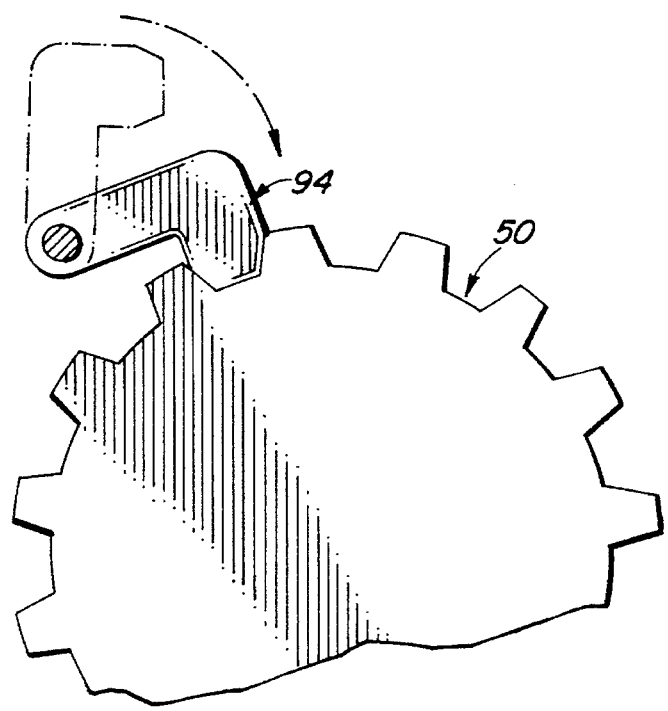
FIG. 4 is an isolated view illustrating the pivoting lock pin of the present invention.

In the preferred embodiments, the stepless transmission system 10 can be positioned between a drive mode and a neutral mode. The drive mode is defined by driving engagement of the input shaft 15 with the second and third sun gears 40 & 60, and neutral is define by non-drive positioning of the second and third sun gears 40 & 60 about the input shaft 15. Although engagement and disengagement can be achieved through a variety of methods, in the preferred embodiment the second and third sun gears 40 & 60 are integrally formed as part of one cylindrical sun gear disposed about the input shaft 15. Positioned between the axial opening of the third sun gear 60 and the engaging drive portion 17 of the input shaft 15 is an engagement segment 90. Specifically, when in the neutral position the engagement segment 90 is disposed towards the second sun gear 40 such that it will not be drivingly connected with the third sun gear 60, and accordingly will not allow the input shaft 15 to directly rotate the second and third sun gears 40 & 60. In the drive position the engagement segment 90 is slidingly moved along the input shaft 15 until it drivingly engages the third sun gear 60 and accordingly upon rotation of the engagement segment 90, due to rotation of the input shaft 15, the second and third sun gears 40 & 60 will rotate. As illustrated in FIGS. 1 & 2, the engagement segment 90 is connected with a shift segment 96 having an engagement pin 97. The shift segment 96 and engagement segment 90 are connected to one another such that each can rotate independently, but such that upon slided movement of the engagement pin 97 the shift segment 96 and engagement segment 90 will slide between the drive and neutral modes.

When in the neutral position, the transmission of the present invention can also provide for a reverse drive mode and a parking brake mode. Specifically, when in the neutral mode, reverse means are positioned about the third ring gear 70 so as to engage the third ring gear 70 and restrict rotation thereof. The reverse means, which engaged the third ring gear 70 can be of any form which will hold the third ring gear 70 non-rotatably in place, and in the preferred embodiment will include a pivoting lock pin 92 which can engage a number of gear teeth on an exterior of the third ring gear 70. In this reverse mode, reverse rotation of the output shaft 17 results because upon rotation regulation of the first ring gear 30 the first planet gear carrier 22 is caused to rotate, thereby rotating the second ring gear 50. In this neutral mode the second sun gear 40 is not drivingly engaged with the input shaft 15 such that rotation of the second ring gear 50 will result in rotation of the second set of planet gears 48. Further, because the third ring gear 70 is being held in place and is connected to the second planet gear carrier 42, the second planet gear carrier 42 also will not rotate and the rotation of the second set of planet gears 48 will be translated into rotation of the second sun gear 40 in accordance therewith. Finally, because the second and third sun gears 40 & 60 are interconnected as part of one cylindrical gear, rotation of the second sun gear 40 results in corresponding rotation of the third sun gear 60, which finally rotates the third set of planet gears 68 along the interior drive surface 71 of the fixedly held third ring gear 70 resulting in reverse rotation of the third planet gear carrier 62 and reverse rotation of the output shaft 17 connected therewith.

In order to achieve a parking brake mode, parking brake means, also preferably in the form of a pivoting lock pin 94 are included to engage the second ring gear 50. In such a case, when the second ring gear 50 is fixedly held in place, the second set of planet gears 48 and second planet gear carrier 42 will not be rotated by the second ring gear 50, and because the engagement segment 90 is in the neutral position the input shaft 15 will not effect rotation of the second and third sun gears 40 & 60. Therefore, no rotation of the third planet gear carrier 62, and accordingly the output shaft 17, can take place.

Now that the invention has been described,
What is claimed is:
1. A stepless transmission system comprising:

a powering input shaft, a first sun gear drivingly disposed on said input shaft, a first planet gear carrier including an outer perimeter and an inner perimeter defining a peripheral segment, and having an axial opening defined by said inner perimeter wherein said first sun gear is rotatably disposed, a first set of planet gears rotatably and axially mounted within said peripheral segment of said first planet gear carrier, said first set of planet gears protruding from said outer perimeter and said inner perimeter of said first planet gear carrier, and drivingly engaging said first sun gear disposed in said axial opening of said first planet gear carrier, a first ring gear disposed about said first plant gear carrier, said first ring gear including an interior drive surface structured and disposed to drivingly engage said first set of planet gears which protrude from said outer perimeter of said first planet gear carrier, a second sun gear disposed about said input shaft, a second planet gear carrier including an outer perimeter and an inner perimeter defining a peripheral segment, and having an axial opening defined by said inner perimeter wherein said second sun gear is rotatably disposed, a second set of planet gears rotatably and axially mounted within said peripheral segment of said second planet gear carrier, said second set of planet gears protruding from said outer perimeter and said inner perimeter of said second planet gear carrier, and drivingly engaging said second sun gear disposed in said axial opening of said second planet gear carrier, a second ring gear disposed about said second plant gear carrier, said second ring gear including an interior drive surface structured and disposed to drivingly engage said second set of planet gears which protrude from said outer perimeter of said second planet gear carrier, said second ring gear being connected to said first planet gear carrier such that rotation of said first planet gear carrier results in corresponding axial rotation of said second ring gear, a third sun gear disposed about said input shaft, a third planet gear carrier including an outer perimeter and an inner perimeter defining a peripheral segment, and having an axial opening defined by said inner perimeter wherein said third sun gear is rotatably disposed, a third set of planet gears rotatably and axially mounted within said peripheral segment of said third planet gear carrier, said third set of planet gears protruding from said outer perimeter and said inner perimeter of said third planet gear carrier, and drivingly engaging said third sun gear disposed in said axial opening of said third planet gear carrier, a third ring gear disposed about said third plant gear carrier, said third ring gear including an interior drive surface structured and disposed to drivingly engage said third set of planet gears which protrude from said outer perimeter of said third planet gear carrier, said third ring gear being connected to said second planet gear carrier such that rotation of said second planet gear carrier results in corresponding axial rotation of said third ring gear, an output shaft connected to said third planet gear carrier, said first ring gear including rotation regulator means structured and disposed to enable rotation restriction and regulation of said first ring gear, and a rotor disposed about said rotation regulator means, said rotor structured and disposed to selectively limit rotation of said rotation regulator means and accordingly selectively limit rotation of said first ring gear, said selective limitation of the rotation of said first ring gear resulting in a regulated output rotation of said output shaft.

2. A stepless transmission system as recited in claim 1 wherein said rotation regulator means includes a rotation regulator segment connected to said first ring gear and disposed about said input shaft.

3. A stepless transmission system as recited in claim 1 including drive engage means moveable between a drive position and a neutral position, said drive engage means being structured and disposed to drivingly engage said second sun gear and said third sun gear with said input shaft when in said drive position, and disengage said second sun gear and said third sun gear with said input shaft when in said neutral position.

4. A stepless transmission system as recited in claim 3 including reverse means structured and disposed to engage said third ring gear and restrict rotation thereof when said drive engage means are in said neutral position, such that said output shaft rotates in a reverse direction.

5. A stepless transmission system as recited in claim 3 including parking break means structured and disposed to engage said second ring gear and restrict rotation thereof when said drive engage means are in said neutral position, such that said output shaft will not rotate.

6. A stepless transmission system as recited in claim 1 including a hydraulic pump connected with said rotor so as to selectively regulate hydraulic pressure within said rotor and thereby selectively limit rotation of said rotation regulator means.

7. A stepless transmission system comprising:

a powering input shaft, a first sun gear disposed on said input shaft, a first planet gear carrier including an outer perimeter and an inner perimeter defining a peripheral segment, and having an axial opening defined by said inner perimeter wherein said first sun gear is rotatably disposed, a first set of planet gears rotatably and axially mounted within said peripheral segment of said first planet gear carrier, said first set of planet gears protruding from said outer perimeter and said inner perimeter of said first planet gear carrier, and drivingly engaging said first sun gear disposed in said axial opening of said first planet gear carrier, a first ring gear disposed about said first plant gear carrier, said first ring gear including an interior drive surface structured and disposed to drivingly engage said first set of planet gears which protrude from said outer perimeter of said first planet gear carrier, said first ring gear including a drive segment drivingly engaged with said input shaft, a second sun gear disposed about said input shaft, a second planet gear carrier including an outer perimeter and an inner perimeter defining a peripheral segment, and having an axial opening defined by said inner perimeter wherein said second sun gear is rotatably disposed, a second set of planet gears rotatably and axially mounted within said peripheral segment of said second planet gear carrier, said second set of planet gears protruding from said outer perimeter and said inner perimeter of said second planet gear carrier, and drivingly engaging said second sun gear disposed in said axial opening of said second planet gear carrier, a second ring gear disposed about said second plant gear carrier, said second ring gear including an interior drive surface structured and disposed to drivingly engage said second set of planet gears which protrude from said outer perimeter of said second planet gear carrier, said second ring gear being connected to said first planet gear carrier such that rotation of said first planet gear carrier results in corresponding axial rotation of said second ring gear, a third sun gear disposed about said input shaft, a third planet gear carrier including an outer perimeter and an inner perimeter defining a peripheral segment, and having an axial opening defined by said inner perimeter wherein said third sun gear is rotatably disposed, a third set of planet gears rotatably and axially mounted within said peripheral segment of said third planet gear carrier, said third set of planet gears protruding from said outer perimeter and said inner perimeter of said third planet gear carrier, and drivingly engaging said third sun gear disposed in said axial opening of said third planet gear carrier, a third ring gear disposed about said third plant gear carrier, said third ring gear including an interior drive surface structured and disposed to drivingly engage said third set of planet gears which protrude from said outer perimeter of said third planet gear carrier, said third ring gear being connected to said second planet gear carrier such that rotation of said second planet gear carrier results in corresponding axial rotation of said third ring gear, an output shaft connected to said third planet gear carrier, said first sun gear including a rotation regulator means structured and disposed to enable rotation restriction and regulation of said first sun gear, and a rotor disposed about said rotation regulator means, said rotor structured and disposed to selectively limit rotation of said rotation regulator means and accordingly selectively limit rotation of said first sun gear, said selective limitation of the rotation of said first sun gear resulting in a regulated output rotation of said output shaft.

8. A stepless transmission system as recited in claim 7 wherein said rotation regulator means includes a rotation regulator segment connected to said first sun gear and disposed about said input shaft.

9. A stepless transmission system as recited in claim 7 including drive engage means moveable between a drive position and a neutral position, said drive engage means being structured and disposed to drivingly engage said second sun gear and said third sun gear with said input shaft when in said drive position, and disengage said second sun gear and said third sun gear with said input shaft when in said neutral position.

10. A stepless transmission system as recited in claim 9 including reverse means structured and disposed to engage said third ring gear and restrict rotation thereof when said drive engage means are in said neutral position, such that said output shaft rotates in a reverse direction.

11. A stepless transmission system as recited in claim 9 including parking break means structured and disposed to engage said second ring gear and restrict rotation thereof when said drive engage means are in said neutral position, such that said output shaft will not rotate.

12. A stepless transmission system as recited in claim 7 including a hydraulic pump connected with said rotor so as to selectively regulate hydraulic pressure within said rotor and thereby selectively limit rotation of said rotation regulator means.

* * * * *